(12) United States Patent
Gomer et al.

(10) Patent No.: US 12,521,968 B2
(45) Date of Patent: Jan. 13, 2026

(54) LAMINATED PANE WITH A HOLOGRAPHIC ELEMENT AND METHOD FOR PRODUCING THE SAME

(71) Applicant: SAINT-GOBAIN GLASS FRANCE, Courbevoie (FR)

(72) Inventors: Andreas Gomer, Kerpen (DE); Raphaela Perlewitz, Aachen (DE); Adrien Ceripa, Versailles (FR); Daniel Krekel, Aachen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 558 days.

(21) Appl. No.: 18/010,410

(22) PCT Filed: Jun. 10, 2021

(86) PCT No.: PCT/EP2021/065623
§ 371 (c)(1),
(2) Date: Dec. 14, 2022

(87) PCT Pub. No.: WO2021/254872
PCT Pub. Date: Dec. 23, 2021

(65) Prior Publication Data
US 2023/0311457 A1 Oct. 5, 2023

(30) Foreign Application Priority Data
Jun. 15, 2020 (EP) .................................... 20179982

(51) Int. Cl.
*B32B 17/10* (2006.01)
*G02B 27/01* (2006.01)
*G03H 1/02* (2006.01)

(52) U.S. Cl.
CPC .. *B32B 17/10449* (2013.01); *B32B 17/10036* (2013.01); *B32B 17/10724* (2013.01);
(Continued)

(58) Field of Classification Search
CPC ........ B32B 17/10788; B32B 17/10761; B32B 17/1077; B32B 17/08; B32B 17/10724;
(Continued)

(56) References Cited

U.S. PATENT DOCUMENTS 4,842,389 A * 6/1989 Wood ................ B32B 17/10036
156/99
5,066,525 A * 11/1991 Nakamachi ....... B32B 17/10036
430/1
(Continued)

FOREIGN PATENT DOCUMENTS

DE   10 2012 211 729 A1   1/2014
EP   0 420 228 B1   3/1995
(Continued)

OTHER PUBLICATIONS

H.I. Bjelkhagen, "Holography, Applications | Holographic Recording Materials and Their Processing" in: Encyclopedia of Modern Optics (Elsevier 2005), pp. 47-57. [retrieved on Jul. 14, 2025]. Retrieved from the internet: <URL:https://www.sciencedirect.com/science/article/pii/B012369395000779X> (Year: 2005).*
(Continued)

*Primary Examiner* — Bumsuk Won
*Assistant Examiner* — Seth D Moser
(74) *Attorney, Agent, or Firm* — Pillsbury Winthrop Shaw Pittman LLP

(57) ABSTRACT

A laminated pane includes first and second panes, a layer stack arranged therebetween including a first thermoplastic intermediate layer, a separating layer, a photopolymer layer with at least one holographic element, a carrier layer, and a second thermoplastic intermediate layer, wherein the photopolymer layer has a thickness of 5 μm to 50 μm, the carrier layer contains polyethylene terephthalate (PET), polyethylene (PE), polymethyl methacrylate (PMMA), polycarbonate
(Continued)

Figure 1:
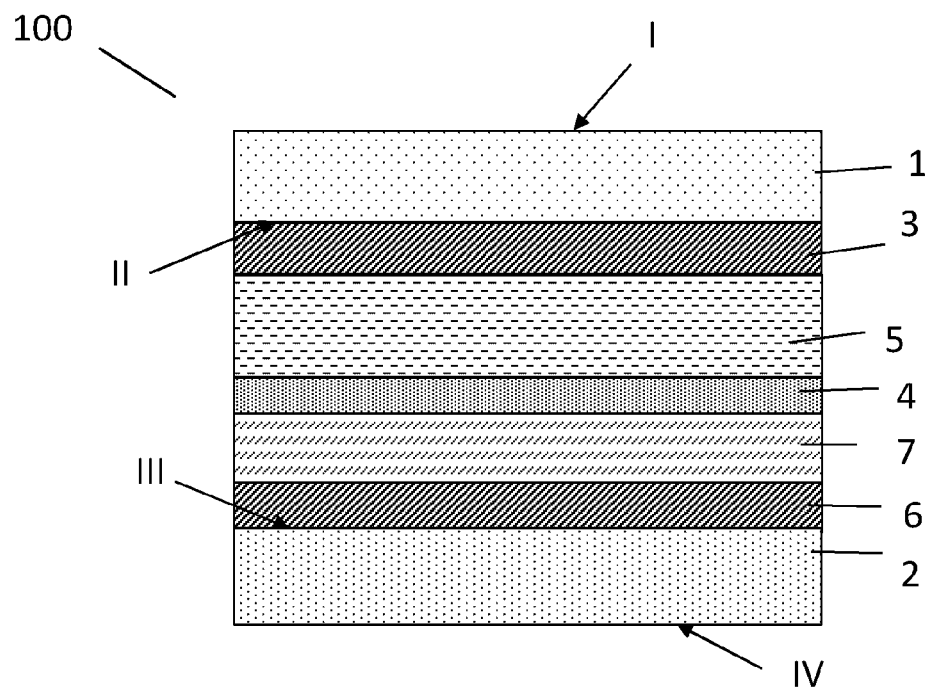

(PC), polyamide (PA), polyvinyl chloride (PVC), and/or cellulose triacetate (TAC) and has a thickness of 20 μm to 100 μm, wherein the carrier layer is arranged directly adjacent the photopolymer layer, and the separating layer contains polyethylene (PE), polyvinyl chloride (PVC), and/or polymethyl methacrylate (PMMA) and has a thickness of 10 μm to 300 μm.

19 Claims, 3 Drawing Sheets

(52) U.S. Cl.
CPC .. *B32B 17/10743* (2013.01); *B32B 17/10807* (2013.01); *G02B 27/0103* (2013.01); *G03H 1/0256* (2013.01); *B32B 2250/05* (2013.01); *B32B 2307/7376* (2023.05); *B32B 2419/00* (2013.01); *B32B 2605/00* (2013.01); *G03H 2260/12* (2013.01); *G03H 2270/11* (2013.01)

(58) Field of Classification Search
CPC ........ B32B 17/10743; B32B 17/10752; B32B 17/10005; G02B 27/0103; G02B 27/0105; G03H 1/0252; G03H 1/0256; G03H 2260/12
USPC ........................................................ 359/3, 13
See application file for complete search history.

(56) References Cited

U.S. PATENT DOCUMENTS

| | | | |
|---|---|---|---|
| 6,476,942 B1* | 11/2002 | Kodama | G03H 1/18 430/1 |
| 8,804,247 B2* | 8/2014 | Sugiyama | G02B 27/0101 359/13 |
| 2019/0056596 A1 | 2/2019 | Bailey et al. | |
| 2019/0101865 A1* | 4/2019 | Popkova | B32B 17/10724 |
| 2022/0063401 A1* | 3/2022 | Aoki | G02B 27/0101 |
| 2023/0145910 A1* | 5/2023 | Gomer | G03H 1/0252 349/11 |
| 2023/0228993 A1* | 7/2023 | Gomer | B32B 17/08 359/15 |

FOREIGN PATENT DOCUMENTS

| | | |
|---|---|---|
| EP | 1 438 634 B1 | 3/2011 |
| JP | H07-315893 A | 12/1995 |
| WO | WO 2011/054797 A1 | 5/2011 |
| WO | WO 2012/156124 A1 | 11/2012 |
| WO | WO 2018/206503 A1 | 11/2018 |

OTHER PUBLICATIONS

KR International Search Report as issued in International Patent Application No. PCT/EP2021/065623, dated Jul. 5, 2021.

* cited by examiner

LAMINATED PANE WITH A HOLOGRAPHIC ELEMENT AND METHOD FOR PRODUCING THE SAME

CROSS-REFERENCE TO RELATED APPLICATIONS

This application is the U.S. National Stage of PCT/EP2021/065623, filed Jun. 10, 2021, which in turn claims priority to European patent application number 20 179 982.2 filed Jun. 15, 2020. The content of these applications are incorporated herein by reference in their entireties.

The invention relates to a laminated pane with a holographic element, a method for the production of such a laminated pane, and the use of such a laminated pane.

Laminated panes are currently used in many places, in particular in the vehicle sector. Here, the term "vehicle" includes, among other things, road vehicles, aircraft, watercraft, agricultural machinery, or even work equipment. Laminated panes are also used in other sectors. These include, for example, architectural glazings or information displays, e.g., in museums or as advertising displays.

In vehicles, laminated panes are also used as head-up displays (HUD) for displaying information. A head-up display is a display system, in which the viewer can maintain his/her line of sight because the visual information is projected into his/her field of vision. An image is projected by means of a projection apparatus onto the laminated glass pane to insert information into the field of vision of the viewer. In the vehicle sector, the projection apparatus is, for example, arranged on the dashboard such that the projected image is reflected on the nearest glass surface of the laminated glass pane inclined in the direction of the viewer (cf., e.g., the European patent EP 0 420 228 B1 or the German published application DE 10 2012 211 729 A1).

Reflection holograms that are laminated between the panes of a laminated pane can be used for head-up displays. The reflection hologram can contain information recorded therein. The hologram can be activated by means of light emitted from a projector and thus the information recorded in the hologram can be reproduced for the viewer. Head-up displays comprising holographic optical elements are disclosed, for example, in the publications WO 2012/156124 A1 and US 2019/0056596 A1.

In the production of laminated panes with a holographic optical element, a layer of photopolymers is generally laminated between two panes. The lamination usually requires two layers of thermoplastic polymers, such as polyvinyl butyral, between which the photopolymer layer is arranged. These thermoplastic polymers often contain plasticizers or other compounds that can diffuse into the photopolymer layer. This can cause the photopolymer layer to swell or shrink, adversely affecting the holographic optical element. This effect is particularly strong when the holographic optical element is already contained in the photopolymer layer before lamination. This results in the hologram not being visible after lamination under the same conditions (the same laser and the same eyebox) as intended when the holographic optical element was produced.

US 2019/0101865 A1 describes a method for producing a laminated holographic display in which a photopolymer layer is laminated between two glass panes using polymer layers. In this case, the exposure of the photopolymer layer, by which the holographic optical element is produced, takes place after the lamination step such that the entire lamination of the laminated pane must be done in the dark. This is technically difficult and costly.

U.S. Pat. No. 5,066,525 A describes a windshield with a hologram film laminated between two panes, wherein one or two PVB layers can be used to join the panes.

JP H07315893 A describes a laminated pane with two hologram films that are embedded between the two individual panes by lamination with multiple intermediate layers. The construction with two hologram films is quite complex since multiple carrier layers are required during production.

The object of the present invention is to provide an improved laminated pane having a holographic optical element that is simple to manufacture and to provide a simple method for producing the laminated pane.

The object of the present invention is accomplished according to the invention by a laminated pane in accordance with claim 1. A method for the production of the laminated pane and use thereof are apparent from further independent claims. Preferred embodiments are apparent from the subclaims.

The invention relates to a laminated pane at least comprising a first pane, a first thermoplastic intermediate layer, a photopolymer layer with a holographic optical element, a second thermoplastic intermediate layer, and a second pane. According to the invention, the laminated pane also has a separating layer that is arranged between the photopolymer layer and the first thermoplastic intermediate layer. This separating layer prevents plasticizers and other components from diffusing out of the thermoplastic intermediate layer into the photopolymer layer with the holographic optical element and causing swelling or shrinkage of the photopolymer there. This yields a layer stack with the following order: (first pane)—first thermoplastic intermediate layer—separating layer—photopolymer layer having a holographic element—second thermoplastic intermediate layer—(second pane). Additional layers can be contained in the layer stack.

Preferably, the layer stack includes only a single photopolymer layer. This simplifies the construction of the pane.

The photopolymer layer is preferably used in conjunction with a carrier layer, which is arranged in the laminated pane according to the invention between the second thermoplastic intermediate layer and the photopolymer layer. This carrier layer is provided, on the one hand, as a carrier film for a thin photopolymer layer and can, at the same time, serve as a diffusion barrier layer, which prevents penetration of plasticizers and other additives out of the thermoplastic intermediate layer into the photopolymer layer. This yields a preferred layer stack with the following order: (first pane)—first thermoplastic intermediate layer—separating layer—photopolymer layer having a holographic element—carrier layer—second thermoplastic intermediate layer—(second pane). Additional layers can be contained in the layer stack.

According to a first preferred embodiment of the laminated pane according to the invention, the laminated pane comprises at least a first pane, a second pane, a layer stack arranged therebetween, at least comprising the following layers in order from the first pane to the second pane: a first thermoplastic intermediate layer, a separating layer, a photopolymer layer having at least one holographic optical element, a carrier layer, and a second thermoplastic intermediate layer. The photopolymer layer has a thickness of 5 μm to 50 μm. The carrier layer contains polyethylene terephthalate (PET), polyethylene (PE), polymethyl methacrylate (PMMA), polycarbonate (PC), polyamide (PA), polyvinyl chloride (PVC), and/or cellulose triacetate (TAC) and has a thickness of 20 μm to 100 μm. The carrier layer is arranged directly adjacent the photopolymer layer. The separating layer contains polyethylene (PE), polyvinyl chloride (PVC), and/or polymethyl methacrylate (PMMA) and has a thickness of 10 µm to 300 µm. Thanks to the combination according to the invention of carrier layers and separating layers, a stable laminated pane is obtained after lamination, without negatively affecting the holographic element in the photopolymer layer, which is easy to produce.

Preferably, the thickness of the photopolymer layer is between 8 µm and 30 µm, particularly preferably between 10 µm and 20 µm. These thicknesses are particularly advantageous for the optical quality of the holographic element. In addition, it is advantageous to reduce the thickness of the comparatively expensive photopolymer layer and to use it in combination with a less expensive carrier layer.

Preferably, the carrier layer consists essentially of polyethylene terephthalate (PET), polyethylene (PE), polymethyl methacrylate (PMMA), polycarbonate (PC), polyamide (PA), polyvinyl chloride (PVC), or cellulose triacetate (TAC). Particularly preferably, the carrier layer consists of polyamide (PA).

Preferably, the carrier layer has a thickness of 40 µm to 90 µm, particularly preferably of 65 µm to 80 µm. These thicknesses are particularly suitable for fulfilling a sufficient barrier function against plasticizers or other additives out of the thermoplastic intermediate layer.

Preferably, the separating layer consists essentially of polyethylene (PE), polyvinyl chloride (PVC), or polymethyl methacrylate (PMMA), particularly preferably of polymethyl methacrylate (PMMA). These separating layers act as an excellent diffusion barrier for plasticizers or other additives out of the first thermoplastic intermediate layer.

Preferably, the separating layer has a thickness of 40 µm to 200 µm, particularly preferably of 65 µm to 150 µm.

Preferably, the layer stack arranged between the first pane and the second pane consists of the following layers: a first thermoplastic intermediate layer, a separating layer, a photopolymer layer having at least one holographic element, a carrier layer, and a second thermoplastic intermediate layer. These layers in combination provide a laminated pane having a holographic element that is optically of high quality. Due to the small number of layers, the laminated pane is easy to manufacture.

According to an alternative second preferred embodiment, the laminated pane according to the invention comprises at least a first pane, a second pane, a layer stack arranged therebetween, at least comprising the following layers in order from the first pane to the second pane: a first thermoplastic intermediate layer, a separating layer, a photopolymer layer with at least one holographic element, a carrier layer, and a second thermoplastic intermediate layer. The photopolymer layer has a thickness of 5 µm to 50 µm. The carrier layer contains polyamide (PA), polycarbonate (PC), polyethylene terephthalate (PET), and/or cellulose triacetate (TAC) and has a thickness of 20 µm to 100 µm. The carrier layer is arranged directly adjacent the photopolymer layer. The separating layer contains polyamide (PA), polycarbonate (PC), polyethylene terephthalate (PET), and/or cellulose triacetate (TAC) and has a thickness of 200 µm to 300 µm or a thickness of 5 µm to 20 µm. Thanks to the combination according to the invention of carrier layers and separating layers, a stable laminated pane is obtained after lamination, without negatively affecting the holographic element in the photopolymer layer, which is easy to produce.

Preferably, the thickness of the photopolymer layer is between 8 µm and 30 µm, particularly preferably between 10 µm and 20 µm. These thicknesses are particularly advantageous for the optical quality of the holographic element. In addition, it is advantageous to reduce the thickness of the comparatively expensive photopolymer layer and to use it in combination with a less expensive carrier layer.

Preferably, the carrier layer consists essentially of (PA), polycarbonate (PC), polyethylene terephthalate (PET), or cellulose triacetate (TAC). Particularly preferably, the carrier layer contains or consists of polyethylene terephthalate (PET). These materials give a thin photopolymer layer the mechanical stability for easy further processing and act, at the same time, as a barrier against the diffusion of plasticizers out of the thermoplastic intermediate layer.

Preferably, the carrier layer has a thickness of 40 µm to 90 µm, particularly preferably of 65 µm to 80 µm. These thicknesses are particularly suitable for fulfilling an effective barrier function against plasticizers or other additives out of the thermoplastic intermediate layer.

Preferably, the separating layer consists essentially of polyamide (PA), polycarbonate (PC), polyethylene terephthalate (PET), or cellulose triacetate (TAC). Particularly preferably, the separating layer is made of polyethylene terephthalate (PET). These separating layers act as an excellent diffusion barrier for plasticizers out of the first thermoplastic intermediate layer.

Preferably, the separating layer has a thickness of 220 µm to 260 µm.

Preferably, the layer stack arranged between the first pane and the second pane consists of the following layers: a first thermoplastic intermediate layer, a separating layer, a photopolymer layer with at least one holographic element, a carrier layer, and a second thermoplastic intermediate layer. These layers in combination provide a laminated pane having a holographic element that is optically of high quality. Due to the small number of layers, the laminated pane is easy to manufacture.

According to a third preferred embodiment, the laminated pane according to the invention comprises at least a first pane, a second pane, a layer stack arranged therebetween, at least comprising the following layers in order from the first pane to the second pane: a first thermoplastic intermediate layer, a separating layer, a photopolymer layer having at least one holographic element, a carrier layer, and a second thermoplastic intermediate layer. The photopolymer layer has a thickness of 5 µm to 50 µm. The carrier layer contains polyethylene (PE), polyvinyl chloride (PVC), and/or polymethyl methacrylate (PMMA) and has a thickness of 20 µm to 100 µm. The carrier layer is arranged directly adjacent the photopolymer layer. The separating layer contains polyethylene terephthalate (PET), polyethylene (PE), polymethyl methacrylate (PMMA), polycarbonate (PC), polyamide (PA), polyvinyl chloride (PVC), and/or cellulose triacetate (TAC) and has a thickness of 10 µm to 300 µm. Thanks to the combination according to the invention of carrier layers and separating layers, a stable laminated pane is obtained after lamination, without negatively affecting the holographic element in the photopolymer layer, which is easy to produce.

Preferably, the thickness of the photopolymer layer is between 8 µm and 30 µm, particularly preferably between 10 µm and 20 µm. These thicknesses are particularly advantageous for the optical quality of the holographic element. In addition, it is advantageous to reduce the thickness of the comparatively expensive photopolymer layer and to use it in combination with a less expensive carrier layer.

Preferably, the carrier layer consists essentially of polyethylene (PE), polyvinyl chloride (PVC), or polymethyl methacrylate (PMMA), particularly preferably the carrier layer consists of polyethylene (PE). These materials give a thin photopolymer layer the mechanical stability for easy further processing and act, at the same time, as a barrier against the diffusion of plasticizers or other additives out of the thermoplastic intermediate layer.

Preferably, the carrier layer has a thickness of 40 µm to 90 µm, particularly preferably of 65 µm to 80 µm. These thicknesses are particularly suitable for fulfilling an effective barrier function against plasticizers or other additives out of the thermoplastic intermediate layer.

Preferably, the separating layer consists essentially of polyethylene terephthalate (PET), polyethylene (PE), polymethyl methacrylate (PMMA), polycarbonate (PC), polyamide (PA), polyvinyl chloride (PVC), or cellulose triacetate (TAC). Particularly preferably, the separating layer is made of polymethyl methacrylate (PMMA). These separating layers act as a diffusion barrier for plasticizers or other additives out of the first thermoplastic intermediate layer.

Preferably, the separating layer has a thickness of 40 µm to 200 µm, particularly preferably of 65 µm to 150 µm.

Preferably, the layer stack arranged between the first pane and the second pane consists of the following layers: a first thermoplastic intermediate layer, a separating layer, a photopolymer layer having at least one holographic element, a carrier layer, and a second thermoplastic intermediate layer. These layers in combination provide a laminated pane having a holographic element that is optically of high quality. Due to the small number of layers, the laminated pane is easy to manufacture.

According to a fourth preferred embodiment, the laminated pane comprises at least a first pane, a second pane, a layer stack arranged therebetween, at least comprising the following layers in order from the first pane to the second pane: a first thermoplastic intermediate layer, a separating layer, a photopolymer layer having at least one holographic element and a second thermoplastic intermediate layer. The photopolymer layer has a thickness of 75 µm to 500 µm. An advantage of this thick photopolymer layer is that the diffusion of plasticizers or other additives out of the adjacent layers does not noticeably affect the quality of the holographic element. The separating layer contains polyethylene (PE), polymethyl methacrylate (PMMA), polyvinyl chloride (PVC), polyamide (PA), polycarbonate (PC), polyethylene terephthalate (PET), and/or cellulose triacetate (TAC) and has a thickness of 10 µm to 300 µm. The separating layer prevents plasticizers or other additives in the photopolymer layer from diffusing and thus prevents the swelling of the photopolymer layer. Thus, after lamination, a stable laminated pane is obtained, without negatively affecting the holographic element, which is particularly easy to produce.

Preferably, the photopolymer layer is directly adjacent the second thermoplastic intermediate layer. This means that no other layer that acts as a diffusion barrier against plasticizers or other additives is arranged between the photopolymer layer and the second thermoplastic intermediate layer. Since the photopolymer layer according to this fourth embodiment is comparatively thick, no carrier layer is needed to improve mechanical stability. The construction of the layer stack is thus simplified.

Preferably, the thickness of the photopolymer layer is between 100 µm and 400 µm, particularly preferably between 150 µm and 250 µm. At these thicknesses, the mechanical stability of the photopolymer layer is so high that it can be processed without difficulty without a carrier layer and, at the same time, the diffusion of plasticizers or other additives does not negatively affect the optical quality of the holographic element.

Preferably, the separating layer consists essentially of polyethylene (PE), polymethyl methacrylate (PMMA), polyvinyl chloride (PVC), polyamide (PA), polycarbonate (PC), polyethylene terephthalate (PET), or cellulose triacetate (TAC). Particularly preferably, the separating layer consists of polymethyl methacrylate (PMMA). These separating layers act as an excellent diffusion barrier for plasticizers or other additives out of the first thermoplastic intermediate layer.

Preferably, the separating layer has a thickness of 40 µm to 200 µm, particularly preferably of 65 µm to 150 µm.

Preferably, the layer stack arranged between the first pane and the second pane consists of the following layers: a first thermoplastic intermediate layer, a separating layer, a photopolymer layer having at least one holographic element, and a second thermoplastic intermediate layer. These layers in combination provide a laminated pane having a holographic element that is optically of high quality. Because the carrier layer is not needed, the number of layers is small such that the laminated pane is particularly easy to manufacture.

The following statements concerning the laminated pane and its components refer to all four preferred embodiments described above.

The first pane and the second pane have in each case an exterior-side surface, i.e., an outer surface, and an interior-side surface, i.e., an inner surface, and a peripheral side edge extending therebetween. In the context of the invention, "outer surface" refers to that primary surface that is intended to face the external surroundings in the installed position. In the context of the invention, "inner surface" refers to that primary surface that is intended to face the interior in the installed position. The inner surface of the first pane and the outer surface of the second pane face one another in the laminated pane according to the invention.

If the laminated pane is intended, in a window opening of a vehicle or a building, to separate an interior from the external surroundings, "inner pane" refers, in the context of the invention, to the pane facing the interior (vehicle interior). "Outer pane" refers to the pane facing the external surroundings. The first pane can be the outer pane or the inner pane and the second pane can be the outer pane or the inner pane. Preferably, the first pane is the outer pane; and the second pane, the inner pane.

The photopolymer layer consists of a layer of photopolymer and includes a holographic element. The holographic element is recorded there by means of laser interference or introduced by an embossing process. Suitable photopolymers are known to the person skilled in the art and are described, for example, in EP1438634B1, in WO2011054797A1, and WO2018206503A1. Cross-linked polyurethanes are preferred.

The first thermoplastic intermediate layer and the second thermoplastic intermediate layer contain or consist of, independently of one another, at least polyvinyl butyral (PVB), ethylene vinyl acetate (EVA), polyurethane (PU), or copolymers or derivatives thereof, preferably polyvinyl butyral (PVB), particularly preferably polyvinyl butyral (PVB), and additives known to the person skilled in the art, such as plasticizers.

The first thermoplastic intermediate layer and the second thermoplastic intermediate layer can, independently of one another, be formed by a single film or also by more than one film.

The first thermoplastic intermediate layer and/or the second thermoplastic intermediate layer can, independently of one another, also be a functional intermediate layer, in particular an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. For example, the first thermoplastic intermediate layer or the second thermoplastic intermediate layer can, for example, also be a band filter film.

The thicknesses of the first thermoplastic intermediate layer and/or the second thermoplastic intermediate layer are, independently of one another, between 30 µm to 1500 µm, preferably between 50 µm and 760 µm.

The first pane and the second pane are preferably made of glass, particularly preferably soda lime glass, as is customary for window panes. However, the panes can, independently of one another, also be made of other types of glass, for example, quartz glass, borosilicate glass, or aluminosilicate glass, or of rigid clear plastics, for example, polycarbonate or polymethyl methacrylate. The panes can be clear or also tinted or colored. If the laminated pane is used as a windshield, it should have sufficient light transmittance in the central field of vision, preferably at least 70% in the primary through-vision region A in accordance with ECE-R43.

The first pane, the second pane, the first thermoplastic intermediate layer, and/or the second intermediate layer can have suitable coatings known per se, for example, antireflection coatings, nonstick coatings, anti-scratch coatings, photocatalytic coatings, or solar protection coatings or low E coatings. In the case of solar protection coatings, coatings that are as spectrally neutral as possible are preferred and/or these are preferably applied on the first thermoplastic intermediate layer or on the first pane, in particular on the inner surface of the first pane.

The thickness of the first pane and the second pane can vary widely and thus be adapted to the requirements in the individual case. The first pane and the second pane preferably have thicknesses of 0.5 mm to 5 mm auf, particularly preferably of 1 mm to 3 mm, most particularly preferably of 1.6 mm to 2.1 mm. For example, an outer pane has a thickness of 2.1 mm; and an inner pane, a thickness of 1.6 mm. However, the outer pane or in particular the inner pane can also be thin glass with a thickness of 0.55 mm, for example.

The laminated pane according to the invention can include one or more additional intermediate layers, in particular functional intermediate layers. An additional intermediate layer can, in particular, be an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. When multiple additional intermediate layers are present, they can also have different functions.

The invention also includes a projection assembly for displaying information for a viewer, at least comprising a laminated pane according to the invention and a projector aimed from the inside at the holographic optical element. The laminated pane according to the invention can be implemented as described above in the various embodiments.

The projector emits light at wavelengths to which the holographic optical element is responsive.

Laser projectors are preferred because very discrete wavelengths can be achieved therewith.

The features of the previously described embodiments of the laminated pane also refer to the projection assembly, which is thus disclosed with all four described embodiments of the laminated pane.

The invention further relates to a method for producing a laminated pane according to the invention according to the previously described first, second, or third embodiment, wherein at least:
 a) a first pane having an outer surface and an inner surface, a first thermoplastic intermediate layer, a second thermoplastic intermediate layer, a separating layer, and a second pane having an outer surface and an inner surface are provided,
 b) a thin photopolymer layer having a holographic optical element is provided, wherein the thin photopolymer layer with a layer thickness of 5 µm to 50 µm is applied on a carrier layer,
 c) a layer stack is formed with the following sequence of layers and panes: first pane—first thermoplastic intermediate layer—separating layer—thin photopolymer layer having a holographic element—carrier layer—second thermoplastic intermediate layer—second pane,
 d) the layer stack is joined by lamination.

All laminated panes according to the preferred first, second, and third embodiments can be produced with this method. The statements concerning the preferred features of the laminated pane are thus also applicable to the method. Reference is hereby made to the above statements.

An advantage of this method is that the holographic optical element is already contained in the layer stack prior to lamination such that steps c) and d) can be carried out in the presence of daylight. This is a particular advantage compared to the prior art, in which the lamination must be carried out with the exclusion of light. Furthermore, thanks to the combination according to the invention of the carrier layer and the separating layer, an adverse effect on the holographic element in the photopolymer layer due to diffusion of plasticizers into the photopolymer layer is prevented.

The invention further relates to a method for producing a laminated pane according to the invention according to the previously described first, second, or third embodiment, wherein at least:
 a) a first pane having an outer surface and an inner surface, a first thermoplastic intermediate layer, a second thermoplastic intermediate layer, and a second pane having an outer surface and an inner surface are provided,
 b) a thin photopolymer layer having a holographic optical element is provided, wherein the thin photopolymer layer with a layer thickness of 5 µm to 50 µm is arranged in a film laminate between a separating layer and a carrier layer,
 c) a layer stack is formed with the following sequence of layers and panes: first pane—first thermoplastic intermediate layer—separating layer—thin photopolymer layer having a holographic element—carrier layer—second thermoplastic intermediate layer—second pane,
 d) the layer stack is joined by lamination.

All laminated panes according to the preferred first, second, and third embodiments can be produced with this method. The statements concerning the preferred features of the laminated pane are thus also applicable to the method. Reference is hereby made to the above statements.

In this method as well, the steps c) and d) can be carried out in the presence of daylight, significantly simplifying the performance of the production method. Compared to the previously described method, the provision of the thin photopolymer layer in combination with the carrier layer and the separating layer further contributes to the mechanical stability of the photopolymer layer. In addition, the forming of the layer stack is further simplified thanks to the smaller number of individual components compared to the previously described embodiment. In addition, the photopolymer layer is protected on both sides during processing by the directly bonded separating layer.

The invention further includes a method for producing a laminated pane according to the invention according to the previously described fourth embodiment, wherein at least:
a) a first pane having an outer surface and an inner surface, a first thermoplastic intermediate layer, a second thermoplastic intermediate layer, a separating layer, a thick photopolymer layer having a holographic optical element, and a second pane having an outer surface and an inner surface are provided, wherein the thick photopolymer layer has a thickness of 75 µm to 500 µm,
b) a layer stack is formed with the following sequence of layers and panes: first pane—first thermoplastic intermediate layer—separating layer—thick photopolymer layer having a holographic element—second thermoplastic intermediate layer—second pane,
c) the layer stack is joined by lamination.

All laminated panes according to the preferred fourth embodiment can be produced with this method. The statements concerning the preferred features of the laminated pane are thus also applicable to the method. Reference is hereby made to the above statements.

In this method, steps b) and c) can be carried out in the presence of daylight, significantly simplifying the performance of the production method. Since, compared to the previously described method, the photopolymer layer is provided separately without a carrier layer or a separating layer, production of a corresponding film is eliminated such that the production process is simplified. Alternatively preferred, in step a), the thick photopolymer layer can also be provided in combination with the separating layer.

The invention also includes the use of a laminated pane according to the invention as interior glazing or exterior glazing in a vehicle or a building, in particular as a vehicle pane in means of locomotion for travel on land, in the air, or on water, in particular in motor vehicles and in particular as a windshield that serves as a projection surface.

Figure 2:
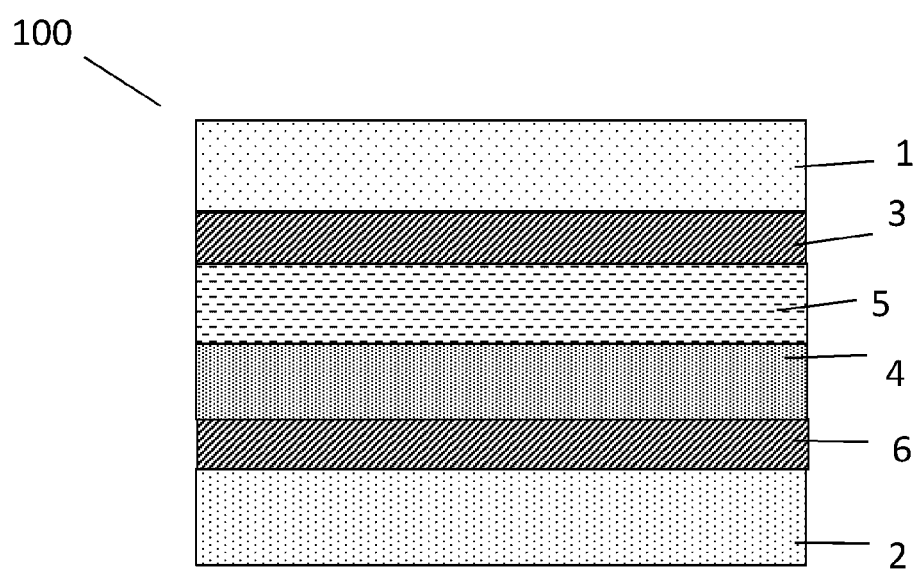
Figure 3:
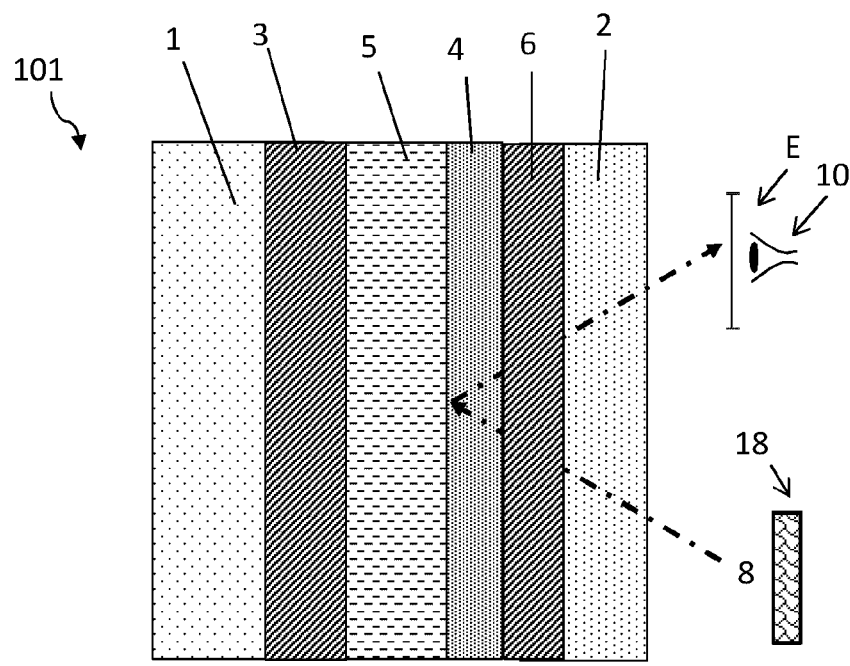
Figure 4:
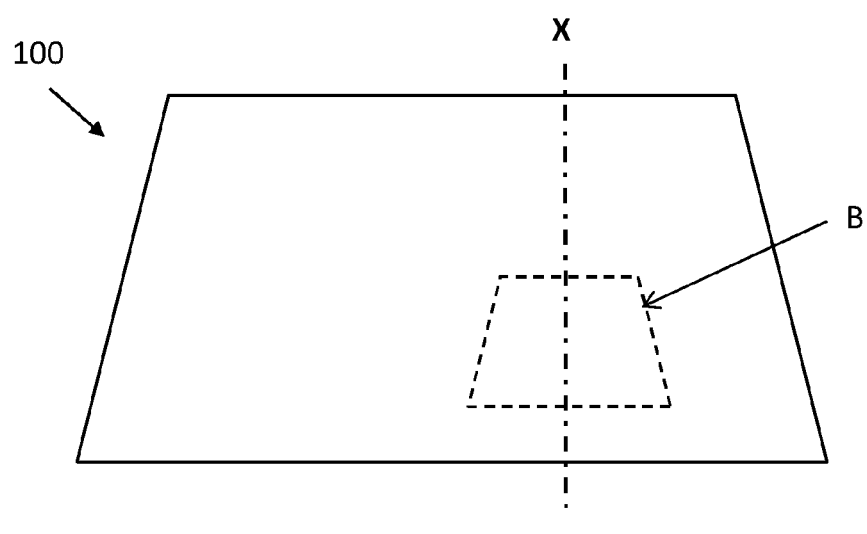
Figure 5:
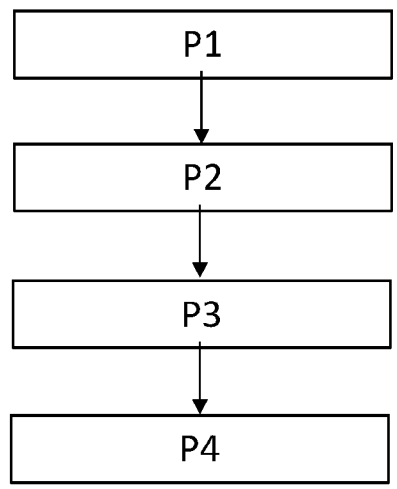
Figure 6:
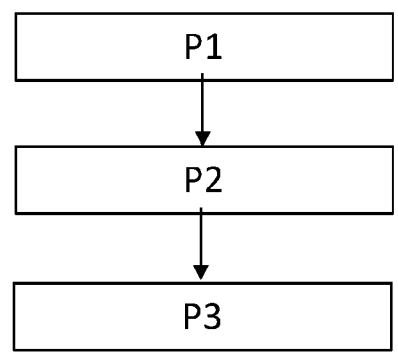

The invention is explained in detail with reference to drawings and exemplary embodiments. The drawings are schematic representations and are not to scale. The drawings in no way restrict the invention. They depict:

FIG. 1 a cross-section of a design according to a first, second, and third embodiment of a laminated pane 100 according to the invention, FIG. 2 a cross-section of a design according to a fourth embodiment of a laminated pane 100 according to the invention, FIG. 3 a cross-section through an embodiment of a projection assembly 101 according to the invention, FIG. 4 a plan view of an embodiment of a laminated pane 100 according to the invention, FIG. 5 an exemplary embodiment of a method according to the invention using a flow chart, and FIG. 6 another exemplary embodiment of a method according to the invention using a flow chart.

FIG. 1 depicts a cross-section of a design according to a first, second, and third embodiment of a laminated pane 100 according to the invention. In the embodiment depicted in FIG. 1, the laminated pane 100 has a first pane as an outer pane 1 with an inner surface II and an outer surface I, a first thermoplastic intermediate layer 3, a photopolymer layer having a holographic optical element 4, a second thermoplastic intermediate layer 6, and a second pane as an inner pane 2 with an inner surface IV and an outer surface III. The photopolymer layer having a holographic element 4 is arranged between the first pane 1 and the second pane 2. The first thermoplastic intermediate layer 3 is arranged between the first pane 1 and the photopolymer layer 4.

A separating layer 5 is arranged between the first thermoplastic intermediate layer 3 and the photopolymer layer 4. The separating layer 5 prevents plasticizers or other added compounds from diffusing out of the first thermoplastic intermediate layer 3 into the photopolymer layer 4 and resulting there in swelling of the photopolymer layer 4, which would adversely affect the holographic element.

A carrier layer 7 is arranged between the second thermoplastic intermediate layer 6 and the photopolymer layer 4. The carrier layer 7 serves as a carrier for a thin photopolymer layer 4 and, at the same time, prevents plasticizers or other added compounds from diffusing out of the second thermoplastic intermediate layer 6 into the photopolymer layer 4 and resulting there in swelling of the photopolymer layer 4, which would adversely affect the holographic element in the photopolymer layer. The carrier layer 7 is directly adjacent the photopolymer layer 4, in other words, there is no further layer between the carrier layer 7 and the photopolymer layer 4.

The outer pane is made, for example, of soda lime glass and is 2.1 mm thick. The inner pane 2 is made, for example, of soda lime glass and is 1.6 mm thick.

The first thermoplastic intermediate layer 3 and the second thermoplastic intermediate layer 6 are made, in the embodiments depicted in FIG. 1, for example, of polyvinyl butyral (PVB) and are 0.38 mm thick in each case.

According to a first preferred embodiment, the photopolymer layer 4 is a thin photopolymer layer 4 with a thickness of 5 µm to 50 µm, preferably of 8 µm to 30 µm, particularly preferably of 10 µm to 20 µm, for example, 15 µm. Since the photopolymer layer 4 is the most expensive component of the layer stack, it is advantageous to use the thinnest possible photopolymer layer and, for increasing the mechanical stability, to use the photopolymer layer in combination with a carrier layer 7 that is made of a less expensive material.

The carrier layer 7 is a polymeric layer and contains or consists of polyethylene terephthalate (PET), polyethylene (PE), polymethyl methacrylate (PMMA), polycarbonate (PC), polyamide (PA), polyvinyl chloride (PVC), and/or cellulose triacetate (TAC). Particularly preferably, the carrier layer contains or consists of polyamide (PA). The carrier layer 7 has a thickness of 20 µm to 100 µm, preferably of 40 µm to 90 µm, particularly preferably of 65 µm to 80 µm. These materials give the thin photopolymer layer 4 the necessary mechanical stability for the processing to form a laminated pane. At the same time, they act as a diffusion barrier for plasticizers and other additives out of the second thermoplastic intermediate layer 6.

The separating layer 5 is a polymeric layer and contains or consists of polyethylene (PE), polyvinyl chloride (PVC), and/or polymethyl methacrylate (PMMA). Particularly preferably, the separating layer 5 contains or consists of polymethyl methacrylate (PMMA). PMMA has proved to be particularly suitable since it has particularly high transparency. The separating layer 5 has a thickness of 10 µm to 300 µm, preferably of 40 µm to 200 µm, particularly preferably of 65 µm to 150 µm. These separating layers act as an excellent diffusion barrier for plasticizers and other additives out of the first thermoplastic intermediate layer 3. In conjunction with the previously mentioned carrier layers 7, a stable laminated pane 100 is obtained after lamination, without adversely affecting the holographic element in the photopolymer layer 4.

FIG. 1 further depicts a second preferred embodiment of a laminated pane 100 according to the invention, the layer components of which differ from those of the previously described first embodiment as follows.

According to this second embodiment, the photopolymer layer 4 is a thin photopolymer layer 4 with a thickness of 5 µm to 50 µm, preferably of 8 µm to 30 µm, particularly preferably of 10 µm to 20 µm, for example, 15 µm. Since the photopolymer layer 4 is the most expensive component of the layer stack, it is advantageous to use the thinnest possible photopolymer layer and, for increasing the mechanical stability, to use the photopolymer layer in combination with a carrier layer 7 that is made of a less expensive material.

The carrier layer 7 is a polymeric layer and contains or consists of polyamide (PA), polycarbonate (PC), polyethylene terephthalate (PET), and/or cellulose triacetate (TAC) or. Particularly preferably, the carrier layer 7 contains or consists of polyethylene terephthalate (PET). The carrier layer 7 has a thickness of 20 µm to 100 µm, preferably of 40 µm to 90 µm, particularly preferably of 65 µm to 80 µm. These materials give the thin photopolymer layer 4 the necessary mechanical stability for the processing to form a laminated pane. At the same time, they act as a diffusion barrier for plasticizers and other additives out of the second thermoplastic intermediate layer 6.

The separating layer 5 is a polymeric layer and contains or consists of polyamide (PA), polycarbonate (PC), polyethylene terephthalate (PET), and/or cellulose triacetate (TAC). Particularly preferably, the separating layer contains or consists of polyethylene terephthalate (PET). The separating layer 5 has a thickness of 200 µm to 300 µm, preferably of 220 µm to 260 µm. These separating layers act as an excellent diffusion barrier for plasticizers out of the first thermoplastic intermediate layer 3, which is particularly efficient due to the high layer thickness. In conjunction with the previously mentioned carrier layers 7, a stable laminated pane 100 is obtained after lamination, without adversely affecting the holographic element in the photopolymer layer 4. In an alternative preferred design of the second embodiment, the separating layer 5 has a thickness of 5 µm to 20 µm. In this thickness, a sufficient diffusion barrier is produced such that material is advantageously saved.

FIG. 1 further depicts a cross-section of a design according to a third preferred embodiment of a laminated pane 100 according to the invention, the layer components of which differ from those of the previously described first and second embodiments as follows.

According to this third preferred embodiment, the photopolymer layer 4 is a thin photopolymer layer 4 with a thickness of 5 µm to 50 µm, preferably of 8 µm to 30 µm, particularly preferably of 10 µm to 20 µm, for example, 15 µm. Since the photopolymer layer 4 is the most expensive component of the layer stack, it is advantageous to use the thinnest possible photopolymer layer and, for increasing the mechanical stability, to use the photopolymer layer in combination with a carrier layer 7 that is made of a less expensive material.

The carrier layer 7 is a polymeric layer and contains or consists of polyethylene (PE), polyvinyl chloride (PVC) and/or polymethyl methacrylate (PMMA). Particularly preferably, the carrier layer contains or consists of polyethylene (PE). The carrier layer 7 has a thickness of 20 µm to 100 µm, preferably of 40 µm to 90 µm, particularly preferably of 65 µm to 80 µm. These materials give the thin photopolymer layer 4 the necessary mechanical stability for the processing to form a laminated pane. At the same time, they act as a diffusion barrier for plasticizers and other additives out of the second thermoplastic intermediate layer 6. The carrier layer 7 and the photopolymer layer 4 are in direct contact with one another, in other words, there is no further layer between the carrier layer and the photopolymer layer.

The separating layer 5 is a polymeric layer and contains or consists of polyethylene terephthalate (PET), polyethylene (PE), polymethyl methacrylate (PMMA), polycarbonate (PC), polyamide (PA), polyvinyl chloride (PVC), and/or cellulose triacetate (TAC). Particularly preferably, the separating layer 5 contains or consists of polymethyl methacrylate (PMMA). PMMA has proved to be particularly suitable since it has particularly high transparency. The separating layer 5 has a thickness of 10 µm to 300 µm, preferably of 40 µm to 200 µm, particularly preferably of 65 µm to 150 µm. These separating layers act as an excellent diffusion barrier for plasticizers out of the first thermoplastic intermediate layer 3. In conjunction with the previously mentioned carrier layers 7, a stable laminated pane 100 is obtained after lamination, without adversely affecting the holographic element in the photopolymer layer 4, with the optical properties being particularly good in terms of the transparency of the laminated pane and only very low waviness being observable.

FIG. 2 depicts a cross-section of a design according to a fourth preferred embodiment of a laminated pane 100 according to the invention. In this fourth embodiment depicted in FIG. 2, the laminated pane 100 has a first pane 1 with an inner surface II and an outer surface I, a first thermoplastic intermediate layer 3, a photopolymer layer having a holographic element 4, and a second thermoplastic intermediate layer 6 and a second pane 2. The photopolymer layer having a holographic element 4 is arranged between the first pane 1 and the second pane 2. The first thermoplastic intermediate layer 3 is arranged between the first pane 1 and the photopolymer layer 4.

A separating layer 5 is arranged between the first thermoplastic intermediate layer 3 and the photopolymer layer 4. The separating layer 5 prevents plasticizers or other added compounds from diffusing out of the first thermoplastic intermediate layer 3 into the photopolymer layer 4 and resulting there in swelling of the photopolymer layer 4, which would adversely affect the holographic element.

The outer pane is made, for example, of soda lime glass and is 2.1 mm thick. The inner pane 2 is made, for example, of soda lime glass and is 1.6 mm thick.

The first thermoplastic intermediate layer 3 and the second thermoplastic intermediate layer 5 [sic: 6] are made, for example, of polyvinyl butyral (PVB) and are 0.38 mm thick in each case.

According to this fourth embodiment, the photopolymer layer 4 is a thick photopolymer layer 4 with a thickness of 75 µm to 500 µm, preferably of 100 µm to 400 µm, particularly preferably of 150 µm to 250 µm, for example, 200 µm. An advantage of this thick photopolymer layer 4 is that no further carrier layer is required since the photopolymer layer 4 itself already has sufficient mechanical stability. At the same time, possible diffusion of, for example, plasticizers from the second thermoplastic intermediate layer 6 does not affect the quality of the holographic element to the same extent as with a thin photopolymer layer, as depicted, for example, in FIG. 1. According to the fourth embodiment, the photopolymer layer 4 is directly adjacent the second thermoplastic intermediate layer 6 such that no additional layer is arranged between the photopolymer layer 4 and the second thermoplastic intermediate layer 6.

The separating layer 5 is a polymeric layer and contains or consists of polyethylene (PE), polymethyl methacrylate (PMMA), polyvinyl chloride (PVC), polyamide (PA), polycarbonate (PC), polyethylene terephthalate (PET), and/or cellulose triacetate (TAC). Particularly preferably, the separating layer 5 contains or consists of polymethyl methacrylate (PMMA). PMMA has proved to be particularly suitable since it has particularly high transparency. The separating layer 5 has a thickness of 10 µm to 300 µm, preferably of 40 µm to 200 µm, particularly preferably of 65 µm to 150 µm. These separating layers act as an excellent diffusion barrier for plasticizers out of the first thermoplastic intermediate layer 3, which is particularly efficient due to the high layer thickness. With these separating layers, a stable laminated pane 100 is obtained after lamination, without adversely affecting the holographic element in the photopolymer layer 4.

FIG. 3 depicts a cross-section through an embodiment of a projection assembly 101 according to the invention. The projection assembly 101 comprises a laminated pane 100 according to the embodiment depicted in FIG. 2 and a projector 18. The projector 18 is arranged internally. The beam path for light emanating from a projector is provided with the reference character 8 in the drawing. The light emanating from the projector 18 strikes the holographic element in the photopolymer layer 4 and activates the hologram. The light emitted by the projector 18 is reflected by the holographic optical element in the photopolymer layer 4 such that the holograms are perceived by a viewer 10 as virtual or real images on the side of the laminated pane 100 facing away from him/her, when his/her eyes are situated within the so-called "eyebox E".

FIG. 4 depicts a plan view of an embodiment of a laminated pane 100 according to the invention. The region in which the at least one holographic element is arranged is identified in FIG. 4 with the reference character B. FIG. 1 through 3 depict cross-sections along the section line X-X' of various embodiments. The region B is, for example, the HUD region of a laminated pane 100 according to the invention implemented as a windshield.

FIG. 5 depicts an exemplary embodiment of a method according to the invention for producing a laminated pane 100 according to the invention in accordance with FIG. 1 with reference to a flow chart, comprising the steps:

P1 Providing a first pane 1, a first thermoplastic intermediate layer 3, a second thermoplastic intermediate layer 6, a separating layer 5, a second pane 2.

P2 Providing a thin photopolymer layer having a holographic optical element 4, which is applied on a carrier layer 7.

P3 Forming a layer stack with the following sequence of layers and panes: first pane—first thermoplastic intermediate layer—separating layer—photopolymer layer having a holographic element—carrier layer—second thermoplastic intermediate layer—second pane.

P4 Joining the layer stack by lamination.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

All embodiments described with regard to FIG. 1 can be produced by the method described. Providing the thin photopolymer layer in combination with the carrier film contributes to the mechanical stability of the photopolymer layer and thus improves the lamination result since the forming of the layer stack is considerably simplified thanks to the mechanically stable individual layers.

In an alternative preferred embodiment of a method according to the invention for producing a laminated pane 100 according to the invention in accordance with FIG. 1, the steps P1 to P4 are designed as follows:

P1 Providing a first pane 1, a first thermoplastic intermediate layer 3, a second thermoplastic intermediate layer 6, a second pane 2.

P2 Providing a thin photopolymer layer having a holographic optical element 4, which is arranged in a film laminate between a separating layer 5 and a carrier layer 7.

P3 Forming a layer stack with the following sequence of layers and panes: first pane—first thermoplastic intermediate layer—separating layer—photopolymer layer having a holographic element—carrier layer—second thermoplastic intermediate layer—second pane.

P4 Joining the layer stack by lamination.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

All embodiments described with regard to FIG. 1 can be produced by the method described. Providing the thin photopolymer layer in combination with the carrier layer and the separating layer further contributes to the mechanical stability of the photopolymer layer. In addition, the forming of the layer stack is further simplified thanks to the smaller number of individual layers compared to the previously described embodiment. In addition, the photopolymer layer is protected on both sides by the directly bonded separating layer.

FIG. 6 depicts an exemplary embodiment of a method according to the invention for producing a laminated pane 100 according to the invention, as depicted in FIG. 2, with reference to a flow chart, comprising the steps:

P1 Providing a first pane 1, a first thermoplastic intermediate layer 3, a second thermoplastic intermediate layer 6, a separating layer 5, a thick photopolymer layer having a holographic optical element 4, a second pane 2.

P2 Forming a layer stack with the following sequence of layers and panes: first pane—first thermoplastic intermediate layer—separating layer—photopolymer layer having a holographic element—second thermoplastic intermediate layer—second pane.

P3 Joining the layer stack by lamination.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

Since the photopolymer layer 4 is provided separately without a carrier layer or a separating layer, production of a corresponding film is eliminated such that the production process is simplified.

LIST OF REFERENCE CHARACTERS 1 first pane
2 second pane
3 first thermoplastic intermediate layer 4 photopolymer layer having a holographic element, photopolymer layer having a holographic optical element
5 separating layer
6 second thermoplastic intermediate layer
7 carrier layer
8 beam path for light emanating from a projector
10 vehicle driver/viewer
18 projector
100 laminated pane
101 projection assembly
I outer surface of the first pane 1
II inner surface of the first pane 1
III outer surface of the second pane 2
IV inner surface of the second pane 2
B region of holograms
E eyebox
X-X' section line

The invention claimed is:

1. A laminated pane, comprising a first pane, a second pane, a layer stack arranged therebetween, consisting of the following layers in order from the first pane to the second pane: a first thermoplastic intermediate layer, a separating layer, a photopolymer layer with at least one holographic element, a carrier layer, and a second thermoplastic intermediate layer, wherein
   the photopolymer layer has a thickness of 5 µm to 50 µm,
   the carrier layer contains polyethylene terephthalate (PET), polyethylene (PE), polymethyl methacrylate (PMMA), polycarbonate (PC), polyamide (PA), polyvinyl chloride (PVC), and/or cellulose triacetate (TAC) and has a thickness of 20 µm to 100 µm, wherein the carrier layer is arranged directly adjacent the photopolymer layer,
   the separating layer contains polyethylene (PE), polyvinyl chloride (PVC), and/or polymethyl methacrylate (PMMA) and has a thickness of 10 µm to 300 µm.

2. The laminated pane according to claim 1, wherein the thickness of the photopolymer layer is between 8 µm and 30 µm.

3. The laminated pane according to claim 2, wherein the thickness of the photopolymer layer is between 10 µm and 20 µm.

4. The laminated pane according to claim 1, wherein the carrier layer consists essentially of polyethylene terephthalate (PET), polyethylene (PE), polymethyl methacrylate (PMMA), polycarbonate (PC), polyamide (PA), polyvinyl chloride (PVC), or cellulose triacetate (TAC).

5. The laminated pane according to claim 4, wherein the carrier layer consists essentially of polyamide (PA).

6. The laminated pane according to claim 1, wherein the carrier layer has a thickness of 40 µm to 90 µm.

7. The laminated pane according to claim 6, wherein the carrier layer has a thickness of 65 µm to 80 µm.

8. The laminated pane according to claim 1, wherein the separating layer consists essentially of polyethylene (PE), polyvinyl chloride (PVC), or polymethyl methacrylate (PMMA).

9. The laminated pane according to claim 8, wherein the separating layer consists of polymethyl methacrylate (PMMA).

10. The laminated pane according to claim 1, wherein the separating layer has a thickness of 40 µm to 200 µm.

11. The laminated pane according to claim 10, wherein the separating layer has a thickness of 65 µm to 150 µm.

12. Laminated pane according to claim 1, wherein the first thermoplastic intermediate layer and/or the second thermoplastic intermediate layer contain or consist essentially of polyvinyl butyral (PVB), ethylene vinyl acetate (EVA), polyurethane (PU), or copolymers or derivatives thereof.

13. The laminated pane according to claim 1, wherein the first pane and/or the second pane are made of glass.

14. The laminated pane according to claim 13, wherein the first pane and/or the second pane are made of soda lime glass.

15. A projection assembly comprising a laminated pane according to claim 1 and a projector that is aimed at the holographic element, wherein the projector is a laser projector.

16. A method for producing a laminated pane according to claim 1, comprising:
   a) providing a first pane, a first thermoplastic intermediate layer, a second thermoplastic intermediate layer, a separating layer, and a second pane,
   b) providing a photopolymer layer having a holographic optical element, wherein the photopolymer layer is applied on a carrier layer,
   c) forming a layer stack is formed with the following sequence of layers and panes: first pane—first thermoplastic intermediate layer—separating layer—a photopolymer layer having a holographic element—carrier layer—second thermoplastic intermediate layer—second pane,
   d) laminating the layer stack.

17. A method comprising providing a laminated pane according to claim 1 as interior glazing or exterior glazing in a vehicle or a building.

18. The method according to claim 17, wherein the laminated pane is a vehicle pane in vehicle of locomotion for travel on land, in the air, or on water.

19. The method according to claim 18, wherein the laminated pane is a windshield that serves as a projection surface.

* * * * *